(12) United States Patent
Amereller et al.

(10) Patent No.: US 11,884,226 B2
(45) Date of Patent: Jan. 30, 2024

(54) MOTOR VEHICLE HAVING AT LEAST ONE RETAINING DEVICE

(71) Applicant: Bayerische Motoren Werke Aktiengesellschaft, Munich (DE)

(72) Inventors: Maximilian Amereller, Munich (DE); Florian Ober, Reichersbeuern (DE); Sascha Wilhelm, Wolnzach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/794,714

(22) PCT Filed: Dec. 7, 2020

(86) PCT No.: PCT/EP2020/084904
§ 371 (c)(1),
(2) Date: Jul. 22, 2022

(87) PCT Pub. No.: WO2021/148185
PCT Pub. Date: Jul. 29, 2021

(65) Prior Publication Data
US 2023/0074479 A1      Mar. 9, 2023

(30) Foreign Application Priority Data
Jan. 24, 2020   (DE) ............... 10 2020 101 740.5

(51) Int. Cl.
*B60R 21/015*    (2006.01)
*B60R 21/0136*   (2006.01)
(Continued)

(52) U.S. Cl.
CPC .... *B60R 21/01512* (2014.10); *B60R 21/0136* (2013.01); *B60R 21/02* (2013.01);
(Continued)

(58) Field of Classification Search
CPC ................ B60R 2021/0206; B60R 21/08
See application file for complete search history.

(56) References Cited

U.S. PATENT DOCUMENTS

| 4,906,047 A | 3/1990 | Mikami |
| 5,702,123 A | 12/1997 | Takahashi et al. |
| (Continued) | | |

FOREIGN PATENT DOCUMENTS

| CN | 112829708 A | * | 5/2021 | ........... A61G 3/0808 |
| CN | 114954340 A | * | 8/2022 | |
| (Continued) | | | | |

OTHER PUBLICATIONS

English-language Chinese Office Action issued in Chinese application No. 202080093985.0 dated Jun. 1, 2023 (Eight (8) pages).

(Continued)

*Primary Examiner* — Nicole T Verley
(74) *Attorney, Agent, or Firm* — Crowell & Moring LLP

(57) ABSTRACT

A motor vehicle has a passenger compartment for at least one vehicle user and has at least one sensor device for detecting a location of the vehicle user in the passenger compartment. At least one retaining device is used to fix the vehicle user in his/her location. A control device is provided to activate the at least one retaining device according to a signal of at least one impact sensor of the motor vehicle. The at least one retaining device is designed to fix the vehicle user in a location in the passenger compartment different from a vehicle seat of the motor vehicle. A method operates such a motor vehicle.

7 Claims, 2 Drawing Sheets

(51) Int. Cl.
  *B60R 21/02*   (2006.01)
  *B60R 21/207*  (2006.01)
  *B60R 21/214*  (2011.01)
  *B60R 22/24*   (2006.01)
  *B60R 22/26*   (2006.01)
  *B60R 22/46*   (2006.01)
  *B60R 21/01*   (2006.01)

(52) U.S. Cl.
  CPC ......... *B60R 21/207* (2013.01); *B60R 21/214* (2013.01); *B60R 22/24* (2013.01); *B60R 22/26* (2013.01); *B60R 22/46* (2013.01); *B60R 2021/01272* (2013.01)

(56) References Cited

U.S. PATENT DOCUMENTS

| | | |
|---|---|---|
| 5,938,237 A | 8/1999 | Abels |
| 2002/0000490 A1 | 1/2002 | Angerami et al. |
| 2015/0061268 A1* | 3/2015 | Nagasawa ............ B60R 21/231 280/730.1 |
| 2019/0077359 A1* | 3/2019 | Kim .................... B60R 21/233 |
| 2019/0092259 A1 | 3/2019 | Sauermann |
| 2019/0248322 A1* | 8/2019 | Herzenstiel ......... B60R 21/207 |
| 2019/0275974 A1 | 9/2019 | Yetukuri et al. |

FOREIGN PATENT DOCUMENTS

| | | | | |
|---|---|---|---|---|
| DE | 10039661 A1 * | 3/2001 | ............ | B60R 21/16 |
| DE | 100 38 720 A1 | 2/2002 | | |
| DE | 696 16 624 T2 | 8/2002 | | |
| DE | 101 11 380 A1 | 10/2002 | | |
| DE | 10256024 A1 * | 6/2004 | ............ | B60R 21/214 |
| DE | 10260385 A1 * | 9/2004 | ............ | B60R 21/214 |
| DE | 102004054502 A1 * | 5/2006 | ............ | B60R 21/055 |
| DE | 102013200667 A1 * | 7/2014 | ............ | B60N 2/4885 |
| DE | 10 2018 102 868 A1 | 8/2018 | | |
| DE | 10 2018 204 149 A1 | 9/2019 | | |
| DE | 10 2018 207 834 A1 | 11/2019 | | |
| DE | 102018207834 A1 * | 11/2019 | | |
| DE | 112020002352 T5 * | 2/2022 | ......... | B60R 21/0136 |
| DE | 102019210001 B4 * | 3/2022 | ............ | B60N 2/005 |
| EP | 1 127 788 A1 | 8/2001 | | |
| FR | 2 862 263 A1 | 5/2005 | | |
| JP | 2015044548 A * | 3/2015 | ............ | B60R 21/231 |
| WO | WO-2004050435 A1 * | 6/2004 | ............ | B60R 21/214 |
| WO | WO-2019168580 A1 * | 9/2019 | ............ | B60R 21/214 |
| WO | WO-2020231511 A1 * | 11/2020 | ......... | B60R 21/0136 |

OTHER PUBLICATIONS

International Search Report (PCT/ISA/210) issued in PCT Application No. PCT/EP2020/084904 dated Feb. 8, 2021 with English translation (four (4) pages).

German-language Written Opinion (PCT/ISA/237) issued in PCT Application No. PCT/EP2020/084904 dated Feb. 8, 2021 (six (6) pages).

German-language Office Action issued in German Application No. 10 2020 101 740.5 dated Nov. 10, 2020 (five (5) pages).

* cited by examiner

MOTOR VEHICLE HAVING AT LEAST ONE RETAINING DEVICE

BACKGROUND AND SUMMARY

The invention concerns a motor vehicle with a passenger compartment for at least one vehicle user, with at least one sensor device for detecting a location of the vehicle user in the passenger compartment, at least one restraint device for fixing the vehicle user in his location and with a control device for activating the at least one restraint device depending on a signal of at least one impact sensor of the motor vehicle. Furthermore, the invention concerns a method for operating such a motor vehicle.

In order to ensure restraint of vehicle occupants in a motor vehicle, it is currently provided that the respective vehicle occupant wears a seat belt. Even if the motor vehicle is equipped with an airbag system, the vehicle occupants are required to wear respective safety belts. Such safety belts are effective, in particular in the event of an abrupt deceleration of the motor vehicle, in order to ensure that the occupant of the vehicle is restrained for his safety. In this case, the deceleration process can be carried out intentionally or unintentionally, for example due to an impact of the motor vehicle on an obstacle.

DE 10 2018 102 868 A1 describes a restraint system in a vehicle which comprises two vest panels, which enclose a torso of a seat occupant and which are connected to each other at their free ends by means of buckles and clamps. The vest panels are coupled by webbing to belt reels held on the vehicle seat. By means of the belt reels, the detachably attached vest panels can be tightened so that the vest panels retain the seat occupant in the vehicle seat. The vest panels have inflatable chambers. In the event of an impact of the vehicle, an impact sensor transmits a corresponding signal to a controller. Furthermore, an occupancy sensor transmits a signal to the controller, which indicates whether the seat is occupied and the size of the seat occupant. Depending on the size of the seat occupant, corresponding chambers of the vest panels are inflated by means of an inflating device controlled by the controller.

Even with such a restraint system, however, it is necessary that the seat occupant puts on a belt-like restraint device in the form of the mutually connected vest panels.

The fact that in order to ensure the safety of the vehicle user it is therefore necessary for the user to wear the belt comprising the two vest panels must therefore be regarded as disadvantageous. This is accompanied by a restriction of movement for the vehicle user.

In the future, however, automated driving will gain in importance. Therefore, the focus is more and more on doing non-driving activities in addition to the actual driving. This applies in particular to the operation of the motor vehicle at autonomy level 4 or level 4 of automated or autonomous driving. In autonomy level 4, there is a high level of automation, in which the control of the power plant is permanently taken over by the system. Only when driving tasks are no longer handled by the system can the driver be asked to take over the control of the motor vehicle.

Especially with such highly automated driving, a certain freedom of movement is advantageous for the vehicle user. Nevertheless, it is necessary to ensure the safety of the vehicle user(s).

Belt systems are not able to grant a seat occupant the freedom of movement desired in autonomous driving. In addition, it can happen that belt systems fit incorrectly or are forgotten. In addition, wearing belt systems brings discomfort for the vehicle occupant. Finally, belt systems limit the overall experience and benefits of autonomous driving if the vehicle user wants to engage in non-driving activities but has a seat belt on.

It is an object of the invention to create a motor vehicle of the type mentioned above, which at the same time offers the vehicle user particularly great freedom of movement and safety, and a corresponding method of operating a motor vehicle.

This object is achieved according to the invention by a motor vehicle and by a method with the features of the independent claims. Advantageous embodiments of the invention are the subject of the dependent claims and the description.

A motor vehicle according to the invention has a passenger compartment for at least one vehicle user and at least one sensor device for detecting a location of the vehicle user in the passenger compartment. At least one restraint device of the motor vehicle is used to fix the vehicle user in his location. The motor vehicle has a control device for activating the at least one restraint device depending on a signal of at least one impact sensor of the motor vehicle. The at least one restraint device is designed to fix the vehicle user at a location in the passenger compartment different from a vehicle seat of the motor vehicle.

In other words, the activation of the at least one restraint device makes it possible to restrain the vehicle user in his location and to protect him from injury even if the vehicle user is not sitting on a vehicle seat of the motor vehicle, i.e. the vehicle user or vehicle occupant is not a seat occupant. Rather, the vehicle user can move freely in the passenger compartment without being restricted in his freedom of movement by a seat belt. If, by means of at the least one impact sensor, for example, an imminent or currently occurring impact of the motor vehicle on an obstacle is detected, the control device activates the at least one restraint device. The at least one restraint device then fixes the vehicle user at the respective location in the passenger compartment, so that there is no injury to the vehicle user. Consequently, the motor vehicle offers the vehicle user a particularly high degree of freedom of movement and safety at the same time.

In particular, within the passenger compartment there is a free possibility of movement for at least one vehicle user, for example by the vehicle user leaving one vehicle seat and moving to another vehicle seat or being in a different place than the other vehicle seat in the passenger compartment. Despite this increased freedom of movement, safety for the vehicle user is guaranteed. The vehicle user is therefore particularly well able to carry out non-driving activities.

In particular, the vehicle user does not need to wear a safety belt when he is sitting in a vehicle seat of the motor vehicle, nor when he is at a position different from that of a vehicle seat of the motor vehicle. This is because the at least one restraint device that can be activated depending on the signal of at least one impact sensor ensures safe fixing of the vehicle user even if the vehicle user has not put on a seat belt, for example in the event of a collision of the motor vehicle with an obstacle or with another motor vehicle.

The at least one sensor device for detecting the location of the vehicle user in the passenger compartment may in particular comprise at least one camera, wherein by evaluating images recorded by means of the camera the vehicle user can be detected and the location of the vehicle user in the passenger compartment can be determined. The camera is preferably coupled to the control device.

Preferably, the motor vehicle has a plurality of restraint devices. In this case, the control device is designed, depending on the position of the vehicle user, to select from the plurality of restraint devices at least one restraint device for activation, by means of which the vehicle user can be fixed in his location. On the one hand, this ensures that an unnecessary number of restraint devices do not need to be activated.

On the other hand, this makes it possible to ensure to a particularly reliable and particularly large extent that the restraint devices used to fix the respective vehicle user do not interfere with each other. Consequently, a very situation-adapted and targeted fixing or restraint of the vehicle user in his respective location can be achieved.

The at least one restraint device may comprise a gripper arm, which can be moved by activation from a stowage position into a functional position. In the functional position, the gripper arm encompasses the vehicle user at least partially. By activating at least one such gripper arm, it can be particularly reliably prevented that the vehicle user collides with components arranged in the passenger compartment of the motor vehicle, for example in the event of an impact of the motor vehicle on an obstacle. In this way, injury to the vehicle user can be avoided to a particularly large extent.

In addition or alternatively, the at least one restraint device may comprise a catch strap, which is tensionable by activation between a first fastening point and a second fastening point. Also by means of such a catch strap, the vehicle user can be particularly safely fixed or retained at his respective location in order to prevent an injury to the vehicle user, in particular due to collision with harder interior parts of the passenger compartment. In particular, a device for tightening the catch strap may be provided on at least one of the fastening points.

The first fastening point may be formed on a side wall of the motor vehicle and the second fastening point on a component of a vehicle seat of the motor vehicle. By tensioning the tension belt between these fastening points, a particularly situation-appropriate restraint or fixing of the vehicle user can be achieved.

This also applies if, in addition or alternatively, the fastening points are formed on respective components of separate vehicle seats of the motor vehicle. For example, a catch strap stretched between the backrests of a driver's seat and a passenger seat can restrain or fix a vehicle user who is located in the rear area of the motor vehicle in front of a rear vehicle seat. This applies analogously if the tensioned catch strap extends from the side of the motor vehicle to, for example, a substructure of a rear seat of the motor vehicle.

In addition or alternatively, the first fastening point can be formed on a first vehicle pillar of the motor vehicle and the second fastening point on a second vehicle pillar opposite the first vehicle pillar in the direction of the transverse axis of the motor vehicle. Such a fastening of the safety belt is also advantageous for restraining or fixing the vehicle user in his location.

For example, a catch strap can run in the tensioned state between B-pillars of the motor vehicle. In this case, the catch strap can be fitted in the non-tensioned initial state, for example, in the area of a roof of the motor vehicle. In particular, the catch strap can be brought through a slot in a headliner of the roof or a slit-shaped predetermined breaking point provided in the headliner into the position in which the catch strap then runs from one of the B pillars to the opposite B pillar and is tensioned.

However, the tensioned catch strap can also run from a vehicle pillar in the direction of the transverse axis of the vehicle to a diagonally opposite vehicle pillar of the motor vehicle, for example from one of the B-pillars to a C-pillar of the motor vehicle. Furthermore, respective fastening points of the tensioned catch strap may be formed on a vehicle pillar on the one hand and on a component of a vehicle seat on the other hand.

In addition or alternatively, the at least one restraint device may comprise a clamp with a first leg and a second leg. Here, the clamp can be moved from an open position to a closed position by activation. In the closed position, the clamp at least partially encompasses the vehicle user. Such a restraint device is also particularly well suited to fixing the vehicle user at his respective location in such a way that, for example, in the event of an impact of the motor vehicle on an obstacle, an injury to the vehicle user is particularly largely avoided.

In addition or alternatively, the at least one restraint device may comprise an airbag, which can be moved by activation from a stowage position into a functional position. In the functional position, the airbag is filled with a filling medium. Bringing the at least one airbag into the functional position also ensures that the vehicle user is restrained at the respective location. This is because the at least one airbag particularly substantially prevents a movement of the vehicle user in the direction in which the airbag provides impact protection for the vehicle user.

Preferably, the airbag is held on a roof of the motor vehicle and/or on a rear of a seat backrest of a vehicle seat of the motor vehicle. By means of such an airbag, a vehicle user who is not seated on a vehicle seat of the motor vehicle can be particularly well secured or restrained or fixed in his location.

As a filling medium for filling the at least one airbag or gas bag, in particular a gas provided by a gas generator and/or a gas stored in a gas storage container under high pressure can be used.

With the method according to the invention for operating a motor vehicle, a location of a vehicle user in a passenger compartment of the motor vehicle is detected by means of at least one sensor device of the motor vehicle. The vehicle user will be fixed in his location by means of at least one restraint device of the motor vehicle. For this purpose, a control device of the motor vehicle activates the at least one restraint device depending on a signal of at least one sensor of the motor vehicle. The at least one restraint device fixes the vehicle user at a different location in the passenger compartment from a vehicle seat of the motor vehicle. In this way, a particularly high level of safety can also be ensured for a vehicle user who moves freely in the passenger compartment, i.e. for a vehicle user who is not sitting in a vehicle seat.

Nevertheless, the vehicle user is enabled to have a very high degree of freedom of movement in the passenger compartment.

The advantages described for the motor vehicle according to the invention and preferred embodiments also apply to the method according to the invention and vice versa.

Further features of the invention result from the claims, the figures, and the description of the figures. The features and combinations of features mentioned above in the description as well as the features and combinations of features mentioned below in the description of the figures and/or shown in the figures alone are not only able to be used in the respective specified combination, but also in other combinations or on their own.

The invention is now explained in more detail on the basis of preferred embodiments and with reference to the drawings.

DETAILED DESCRIPTION OF THE DRAWINGS

Figure 1:
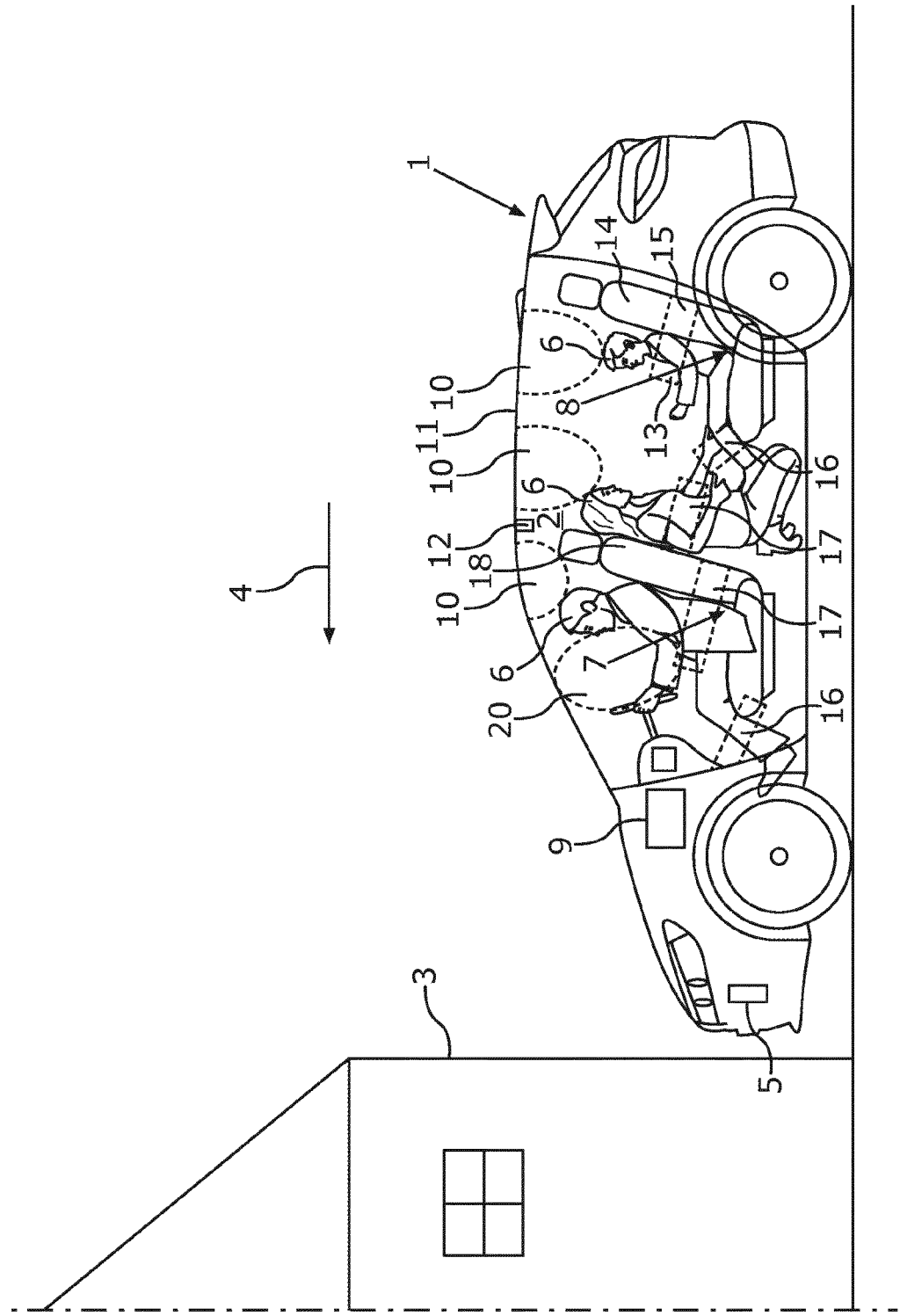
FIG. 1 is a schematic representation of a motor vehicle that impacts an obstacle, wherein vehicle users located in a passenger compartment of the motor vehicle are fixed in their respective locations by means of different restraint devices.

FIG. 1 shows in a highly schematic representation a motor vehicle 1 in the form in the exemplary embodiment of a passenger car with a passenger compartment 2. The motor vehicle 1 is shown in a situation in which the motor vehicle 1 impacts on an obstacle 3. A corresponding direction of travel of the motor vehicle 1 is shown in FIG. 1 by an arrow 4. The motor vehicle 1 is equipped with a plurality of impact sensors, of which one impact sensor 5 is shown by way of example and schematically.

Acceleration sensors and/or pressure sensors or the like can be used as such impact sensors 5. In particular, it can be determined by means of at least one such impact sensor 5 whether a negative acceleration of the vehicle 1 exceeds or will exceed a threshold value, at which, without taking appropriate measures, an impairment of the integrity of vehicle occupants or vehicle users 6 can be assumed.

FIG. 1 shows exemplary and schematic vehicle users 6 or occupants in the passenger compartment 2 of the motor vehicle 1. The vehicle users 6 include a driver seated on a vehicle seat of the motor vehicle 1 in the form of a driver's seat 7. Furthermore, a child seated on a rear vehicle seat 8 of the motor vehicle 1 is schematically depicted as a vehicle user 6. In an area between the driver's seat 7 and the rear seat 8 of the motor vehicle 1, there is another vehicle user 6 in the passenger compartment 2 of the motor vehicle 1, who is kneeling in front of the child and dealing with the child sitting on the rear vehicle seat 8.

FIG. 1 shows a situation in which the control device or a control unit 9 receives a signal of the at least one impact sensor 5 and then activates a plurality of restraint devices. The restraint devices ensure that the respective vehicle users 6 are fixed at their respective locations in such a way that there is no injury to vehicle users 6 in the event of the impact of the motor vehicle 1 on an obstacle 3.

For example, FIG. 1 shows respective airbags 10, which are filled with a filling medium and thus brought into their functional position. These airbags 10 are held on a roof 11 of the motor vehicle and protect the respective vehicle user 6 from an impact on hard components within the passenger compartment 2. The control unit 9 ensures that those airbags 10 which are able to protect the respective vehicle user 6 from injury at his respective location in the passenger compartment 2 are activated, i.e. brought from a stowage position into the functional position shown in FIG. 1.

In order to detect the respective location of the vehicle users 6 in the passenger compartment 2, the motor vehicle 1 has at least one sensor device 12, which is shown schematically in FIG. 1. For example, the sensor device 12 may be in the form of a camera, by means of which the location or the position of the respective vehicle user 6 in the passenger compartment 2 can be recorded.

For example, the control unit 9 activates the airbag 10, which is arranged in the area of the roof 11 above the rear vehicle seat 8, to protect the vehicle user 6 in the form of a child seated on the rear vehicle seat 8 from injury. It is not necessary for the child who has taken a seat on the rear vehicle seat 8 to wear a seat belt. Rather, the restraint devices activated by the control unit 9 ensure that, depending on the respective location in the passenger compartment 2 and the situation, the respective vehicle user 6 is fixed or retained in his respective position in an appropriate manner.

For example, the control unit 9 activates, in addition to or as an alternative to the airbag 10, a catch strap 13 which is fixed in the area of a backrest 14 of the rear vehicle seat 8 to respective fastening points 15. One of the fastening points 15 is shown schematically in FIG. 1. By tensioning the catch strap 13 between the fastening points 15 formed in the area of the backrest 14, the vehicle occupant or vehicle user 6 in the form of the child located on the rear vehicle seat 8 is restrained. As shown in FIG. 1, the catch strap 13 can secure or fix the vehicle user 6 in the form of the child, especially in the area of his torso.

In addition or alternatively, a clamp 16 is shown schematically in the present case, which encompasses the legs of the child on the rear vehicle seat 8 in order to fix the child on the rear vehicle seat 8. The clamp 16 or such a gripping mechanism can be extended, for example, from a component of the rear vehicle seat 8 in order to ensure that the child is fixed after detecting the position of the child in the vehicle seat 8 in the event of an impact on the obstacle 3.

Also the vehicle user 6, who has his back facing the driver's seat 7 and is facing the child, is fixed at his location, which was detected by means of the sensor device 12, on the one hand by means of an airbag 10 stowed in the roof 11 of the motor vehicle 1 and on the other hand by means of a clamp or a gripper arm 17.

The gripper arm 17 may, for example, be accommodated in its stowage position in a backrest 18 of the driver's seat 7 and in its functional position shown schematically in FIG. 1 may engage around the torso region of the vehicle user kneeling in front of the child 6. Furthermore, it is possible to accommodate the gripper arm 17 in its stowage position in the area of a side wall 19 of the motor vehicle 1 (see FIG. 2).

Also the vehicle user 6 in the form of the driver, who has taken a seat in the driver's seat 7, is fixed in his position on the one hand by means of an airbag 10 held on the roof 11 of the motor vehicle 1 and furthermore by means of a driver's airbag 20. Furthermore, the driver is also fixed in his seating position in the area of his torso by means of a gripper arm 17. In addition or alternatively, in the area of the legs or the lower leg of the vehicle user 6 in the form of the driver, a clamp 16 can ensure fixing thereof.

Even the vehicle user 6 sitting in the driver's seat 7 does not need to wear a seat belt. Rather, the restraint devices in the form of the airbag 10 held on the roof 11, the driver's airbag 20, the gripper arm 17 and the clamp 16 ensure that in the event of the impact of the motor vehicle 1 on the obstacle 3 the driver is fixed in such a way that injury to the driver as a result of the impact on the obstacle 3 is particularly substantially avoided.

In the motor vehicle 1, vehicle users 6 are thus offered the opportunity to move in the passenger compartment 2 of the motor vehicle 1 freely and without a seat belt, without being tied to a position. Despite this freedom of movement, the necessary safety of vehicle users 6 is ensured even in the event of an impact of the motor vehicle 1 on the obstacle 3 by the restraint devices described here by way of example.

In particular, the example of vehicle user 6 kneeling in front of the child shows that in the motor vehicle 1 it is possible for vehicle users 6 or occupants to move freely in the passenger compartment 2 without being subject to any restrictions regarding a posture and/or position.

This is particularly advantageous if the motor vehicle 1 is designed for autonomous driving or automated driving. In such an autonomous driving mode, preferably at least one control device of the motor vehicle 1 independently conducts accelerations and decelerations, lane changes, direction changes, and the like.

Even if the respective vehicle user 6 devotes himself to non-driving activities in a different autonomous driving mode of the motor vehicle 1, in the event of an accident or in the event of a necessary restraint device of the body of the respective vehicle user 6 for other reasons the respective vehicle user 6 or occupant is sufficiently protected. This is because the restraint devices activated by the control unit 9 ensure that injuries are avoided. For this purpose, it is recognized in a first step that the at least one vehicle user 6 is in the passenger compartment 2, and the position or the location of the vehicle user 6 captured. This is accomplished by the at least one sensor device 12.

In the next step, the vehicle user 6 is then fixed in the passenger compartment 2 of the motor vehicle 1 by the use of the above-mentioned exemplary restraint devices or by activating these restraint devices depending on the situation so that an injury is particularly substantially avoided.

Thus, the appropriate measures for the location of the vehicle user 6 and the position taken up by the respective vehicle user 6 are applied or taken. In any case, however, the restraint of the vehicle user 6 in the passenger compartment 2 is independent of whether the vehicle user 6 is on a vehicle seat such as the driver's seat 7 or the rear vehicle seat 8 or at a different location from such a vehicle seat.

Figure 2:
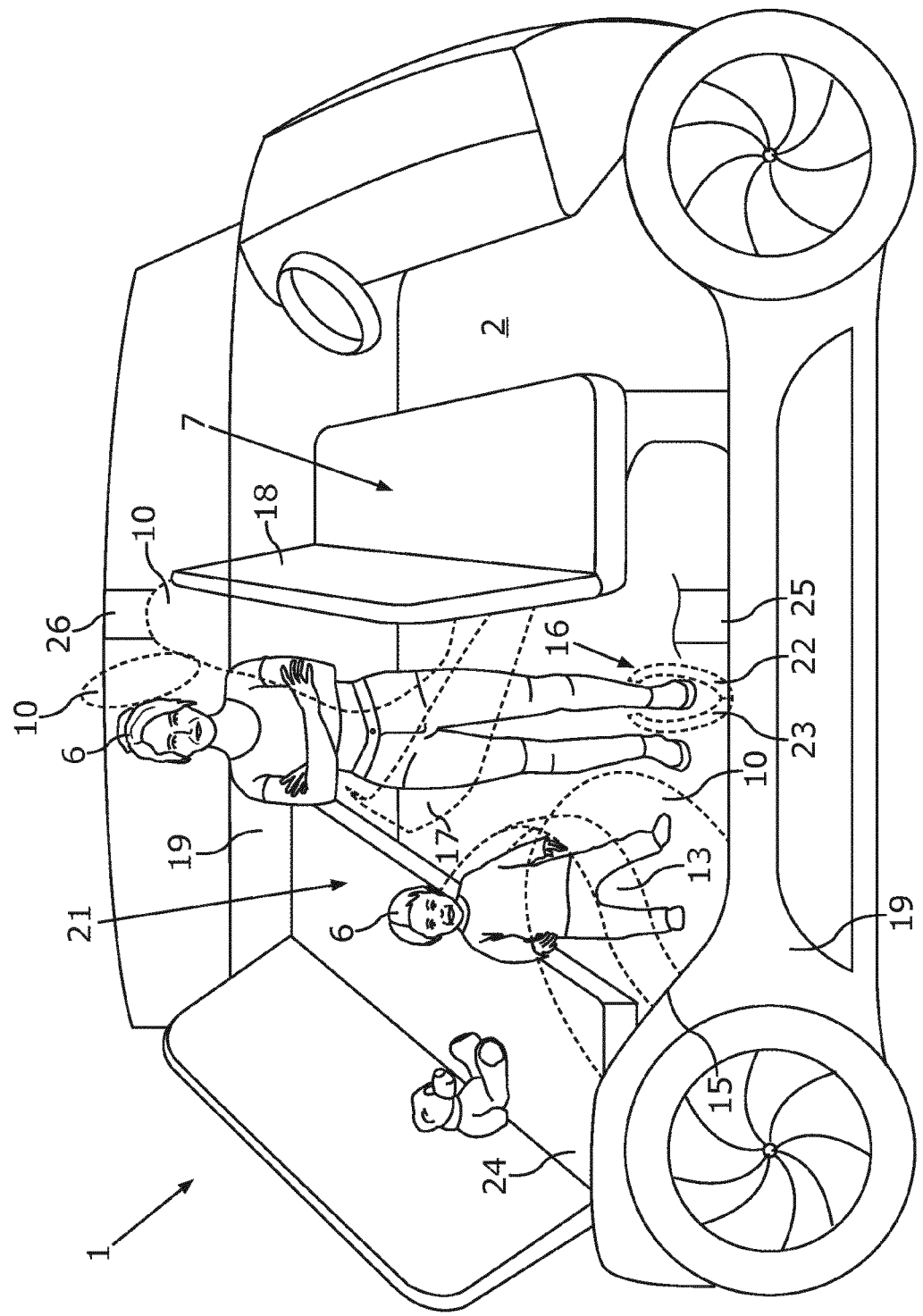
FIG. 2 highly schematically shows a further situation in which vehicle users standing in the passenger compartment of the motor vehicle or motor car are restrained in their respective locations by means of respective restraint devices in such a way that the occurrence of injuries to vehicle users is avoided.

Also in FIG. 2, the passenger compartment 2 of the motor vehicle 1 is shown schematically, wherein a first vehicle user 6, for example in the form of an adult person, is standing in front of a rear bench 21 of the motor vehicle 1 and behind a backrest 18 of the driver's seat 7. In the event of an impact of the motor vehicle 1 on an obstacle 3 (not shown in FIG. 2), this vehicle user 6 is fixed in his position on the one hand by an airbag 10, which is held on the rear of the backrest 18 of the driver's seat 7.

Furthermore, an airbag 10, which may be held on a roof 11 of the motor vehicle 1 (not shown in FIG. 2), provides protection for the head of this vehicle user 6. In addition, FIG. 2 schematically shows a gripper arm 17, which can, for example, extend from the backrest 18 of the driver's seat 7 to at least partially encompass this stationary vehicle user 6 and thus fix him in his position.

Very schematically, FIG. 2 also shows a restraint device in the form of a clamp 16, which comprises a first leg 22 and a second leg 23. End regions or free ends of the legs 22, 23 may be spaced apart in an open position of the clamp 16 and move more towards each other in a closed position of the clamp 16. Thus, the clamp 16 can ensure fixing of at least one part of the body part of the vehicle user 6, for example by at least partially encompassing this body part.

If the ends or free end regions of the legs 22, 23 contact each other in the closing position of the clamp 16, then a complete enclosing of at least one body part of the vehicle user 6 is also possible by means of the clamp 16.

As another vehicle user 6, FIG. 2 shows a child standing in front of a seat cushion 24 of the rear bench 21. This vehicle user 6 is fixed in his location on the one hand by means of an airbag 10, which is deployed from one of the side walls 19 of the motor vehicle 1.

Furthermore, in the present case, the child shown standing in the passenger compartment 2 is fixed in his location by means of a catch strap 13. The catch strap 13 extends from the side wall 19 of the motor vehicle 1 to a supporting structure of the seat cushion 24 of the rear bench 21. The catch strap 13 is fastened at appropriate fastening points 15 on the side wall 19 on the one hand and on the supporting structure of the seat cushion 24 on the other hand. Accordingly, fastening points 15 of the catch strap 13 may be formed on the side wall 19 and approximately in the area of the center of the seat cushion 24 of the rear bench 21. By tensioning such a catch strap 13, the child standing in front of the seat cushion 24 of the rear bench 21 can be fixed in his location.

Furthermore, in FIG. 2 schematic sections of vehicle pillars are shown in the present case in the form of B-pillars 25, 26 of the motor vehicle 1. For example, a catch strap 13 (not shown in FIG. 2) may be provided as a restraint device, which extends from the first B-pillar 25 to the opposite B-pillar 26 in the direction of the transverse axis of the motor vehicle 1. Respective fastening points 15 of the catch strap 13 can thus be formed on the B-pillars 25, 26. Also the tensioning of such a catch strap, for example extending between the B-pillars 25, 26 of the motor vehicle 1, can support or effect the fixing or restraint of the respective vehicle user 6 in his location.

Overall, the examples show how the invention provides a beltless restraint system, i.e. a restraint system dispensing with the wearing of safety belts in the motor vehicle 1.

REFERENCE CHARACTER LIST

1 Motor vehicle
2 Passenger compartment
3 Obstacle
4 Arrow
5 Impact sensor
6 Vehicle user
7 Driver's seat
8 Vehicle seat
9 Control unit
10 Airbag
11 Roof
12 Sensor device
13 Catch strap
14 Backrest
15 Fastening point
16 Clamp
17 Gripper arm
18 Backrest
19 Sidewall
20 Driver's airbag
21 Rear bench
22 Leg
23 Leg
24 Seat cushion
25 B-pillar
26 B-pillar

The invention claimed is:

1. A motor vehicle with a passenger compartment for at least one vehicle user, comprising:
   at least one sensor device for detecting a location of the vehicle user in the passenger compartment, wherein the location is different from that of a vehicle seat of the motor vehicle;

a plurality of restraint devices; and a control device configured, depending on the location of the vehicle user, to select from the plurality of restraint devices at least one restraint device for activation, by which the vehicle user can be fixed in the location, wherein the plurality of restraint devices comprises a first airbag held on a roof of the motor vehicle, a second airbag on a rear of a backrest of the vehicle seat of the motor vehicle, and a third airbag on a sidewall of the motor vehicle;

wherein the motor vehicle is an autonomously drivable passenger car.

2. The motor vehicle according to claim 1, wherein the plurality of restraint devices comprises a gripper arm, which is movable by activation from a stowage position into a functional position in which the gripper arm at least partially encompasses the vehicle user, wherein the gripper arm is accommodated in the backrest of the vehicle seat or in an area of the sidewall in the stowage position.

3. The motor vehicle according to claim 1, wherein the plurality of restraint devices comprises a catch strap, which is tensioned between a first fastening point and a second fastening point by activation.

4. The motor vehicle according to claim 3, wherein the first fastening point is formed on the sidewall of the motor vehicle and the second fastening point on a component of a vehicle seat of the motor vehicle, and/or the first and second fastening points are formed on respective components of spaced apart vehicle seats of the motor vehicle.

5. The motor vehicle according to claim 3, wherein the first fastening point is formed on a first vehicle pillar of the motor vehicle and the second fastening point on a second vehicle pillar of the motor vehicle opposite the first vehicle pillar in the direction of the transverse axis of the vehicle.

6. The motor vehicle according to claim 1, wherein the plurality of restraint devices comprises a clamp with a first leg and a second leg, wherein the clamp is movable by activation from an open position to a closed position in which the clamp at least partially encompasses the vehicle user, and wherein the clamp can be extended from a component of a rear vehicle seat.

7. A method for operating a motor vehicle, comprising:

recording, via at least one sensor device of the motor vehicle, a location of a vehicle user in a passenger compartment of the motor vehicle, wherein the location is different from that of a vehicle seat of the motor vehicle; and selecting, via a control device, depending on the location of the vehicle user, from a plurality of restraint devices at least one restraint device for activation, by which the vehicle user can be fixed in the location, wherein the plurality of restraint devices comprises a first airbag on a roof of the motor vehicle, a second airbag on a rear of a backrest of the vehicle seat of the motor vehicle, and a third airbag on a sidewall of the motor vehicle;

wherein the motor vehicle is an autonomously drivable passenger car.

* * * * *